(12) United States Patent
Slatter (10) Patent No.: US 7,362,625 B2
(45) Date of Patent: Apr. 22, 2008

(54) INTERFACE CONFIGURATION BY A MEMORY TAG

(75) Inventor: David Neil Slatter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 297 days.

(21) Appl. No.: 11/256,939

(22) Filed: Oct. 25, 2005

(65) Prior Publication Data

US 2006/0094380 A1 May 4, 2006

(30) Foreign Application Priority Data

Oct. 29, 2004 (GB) ................................. 0424153.5

(51) Int. Cl.
*G11C 7/00* (2006.01)
(52) U.S. Cl. .................................... 365/192; 340/10.51
(58) Field of Classification Search ................ 365/192; 340/2.1–2.8, 10.1–10.6, 10.51, 572.1–572.9; 235/375–385, 492; 455/151.1, 150.1; 726/20; 700/215, 221, 225, 227
See application file for complete search history.

(56) References Cited

U.S. PATENT DOCUMENTS 6,293,467 B1   9/2001  Reddersen

| | | | |
|---|---|---|---|
| 6,745,008 B1 * | 6/2004 | Carrender et al. | ......... 455/41.1 |
| 6,842,106 B2 * | 1/2005 | Hughes et al. | ............... 340/5.8 |
| 7,155,172 B2 * | 12/2006 | Scott | ........................... 455/70 |
| 7,180,402 B2 * | 2/2007 | Carrender et al. | ......... 340/10.1 |
| 2001/0052842 A1 | 12/2001 | Asama | |

FOREIGN PATENT DOCUMENTS

| | | |
|---|---|---|
| EP | 0261081 A2 | 3/1988 |
| JP | 2004145720 | 5/2004 |
| WO | WO01/08089 | 2/2001 |
| WO | WO02/082363 | 10/2002 |

* cited by examiner

*Primary Examiner*—Richard T. Elms
*Assistant Examiner*—Harry W Byrne (57) ABSTRACT

A memory tag is powered by and addressable via a radio frequency wireless link to read data from a memory. The memory tag is addressable by a reader. The memory holds data and interface configuration information relating to the operation of an interface device. This interface configuration information including at least one status item and an item type associated with the, or each, status item.

20 Claims, 6 Drawing Sheets

INTERFACE CONFIGURATION BY A MEMORY TAG

FIELD OF THE INVENTION

This invention relates to a memory tag which holds interface configuration information, a reader to read the memory tag, method of writing to the memory tag and a method of reading memory tag.

BACKGROUND OF THE INVENTION

Memory tags in the form of Radio Frequency Identification (RFID) tags are well known in the prior art. RFID tags come in many forms but all comprise an integrated circuit on which in use data can be stored and a coil which enables it to be interrogated by a reader which also powers it by means of an inductive (wireless) link. Generally RFID tags are quite large, due to the frequency they operate at (13.56 MHz) and the size of antenna they thus require, and operate over large ranges and have very small storage capacities. Smaller RFID tags have also been developed, operating at various frequencies, but still having small storage capacities. Some RFID tags include Read Only Memory (ROM) and are written to at the time of manufacture, whilst others have read and write capability. RFID tags have tended to be used in quite simple applications, such as for file tracking within offices or in place of or in addition to bar codes for product identification and supply chain management. The storage of more than simple identification data provides challenges for user interaction with the memory tag.

SUMMARY OF THE INVENTION

According to a first aspect of the invention we provide a memory tag having a memory and powered by and addressable via a radio frequency wireless link to read data from the memory, the memory tag being addressable by a reader, wherein the memory holds data and interface configuration information relating to the operation of an interface device, the interface configuration information comprising at least one status item and an item type associated with the or each status item.

BRIEF DESCRIPTION OF THE DRAWINGS

Embodiments of the invention will now be described by way of example with reference to the accompanying drawings in which.

DETAILED DESCRIPTION OF THE PREFERRED EMBODIMENTS

Figure 1:
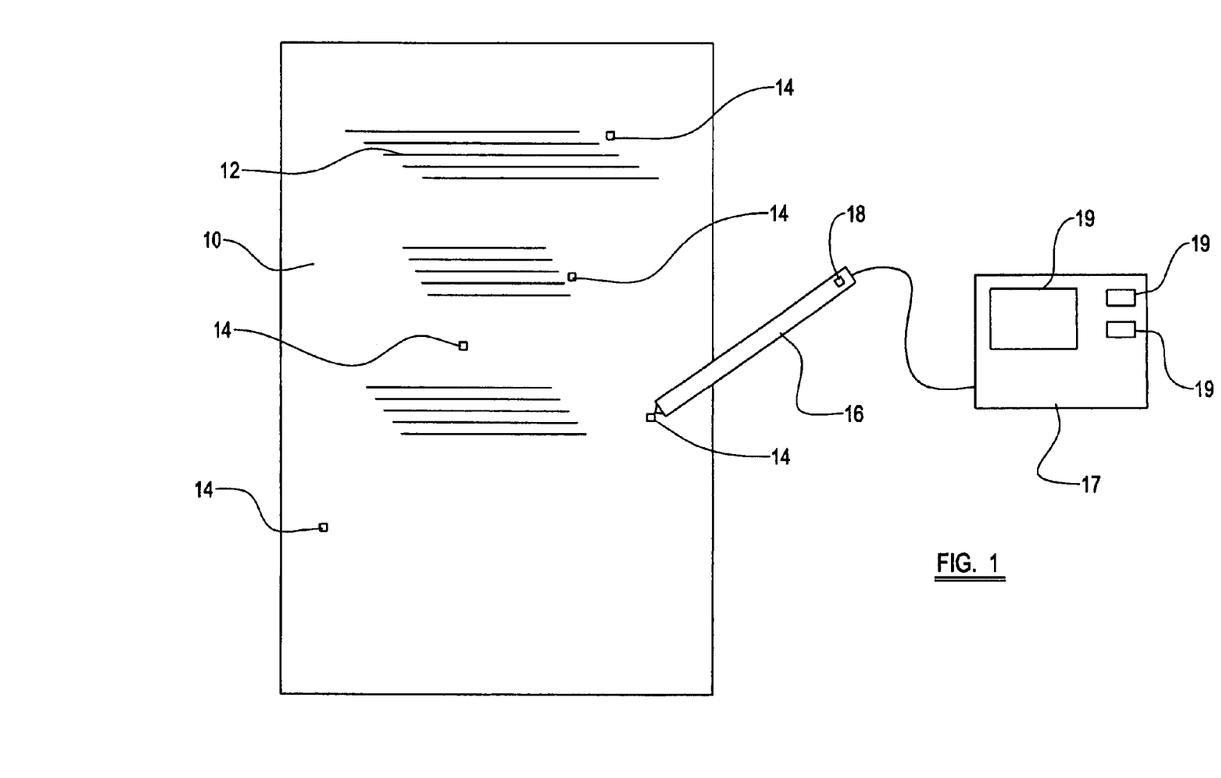
FIG. 1 illustrates a document augmented with memory tags suitable for use in embodiments of the present invention.

FIG. 1 illustrates an document comprising a substrate, in this case a sheet of paper 10, bearing printing 12, which has been annotated with electronic data using a plurality of memory tags 14. The memory tags 14 have been secured to the sheet of paper 10 at various locations over its surface, although they may alternatively be embedded in the paper sheet 10, preferably in locations identified by the printing 12, in order to assist in locating them for the purposes of reading data from or writing data to the memory tags 14.

In this description, the term 'memory tag' is intended to refer to any transponder device which has a memory and is powered by and addressable via a radio frequency wireless link to read data from the memory. The term 'memory tag' thus includes, but is not limited to, RFID tags having a read only memory and transponder devices having a larger memory which may be read from and written to.

A hand held read/write device 16 is used to communicate with the memory tags 14 in wireless manner, as will be discussed further below. The read/write device 16 is also connected to a host computer, display, data rendering device or other apparatus 17 from which the data for writing to the memory tags 14 is received, and/or the data read from the memory tags 14 is passed. User interface devices are shown at 18 on the memory tag 14 and at 19 on the host apparatus 17.

The term 'user interface device' is intended to cover any appropriate apparatus or device by which feedback or information on the operation of the read/write device 16 and/or the memory tag 14 may be supplied to a user. Such an apparatus or device may provide information through sound, status lights, generating information on a screen, through vibration or otherwise. If appropriate, the user interface device may be operable to request instructions or other input from the user. Examples of such user interface devices are discussed below.

Figure 2:
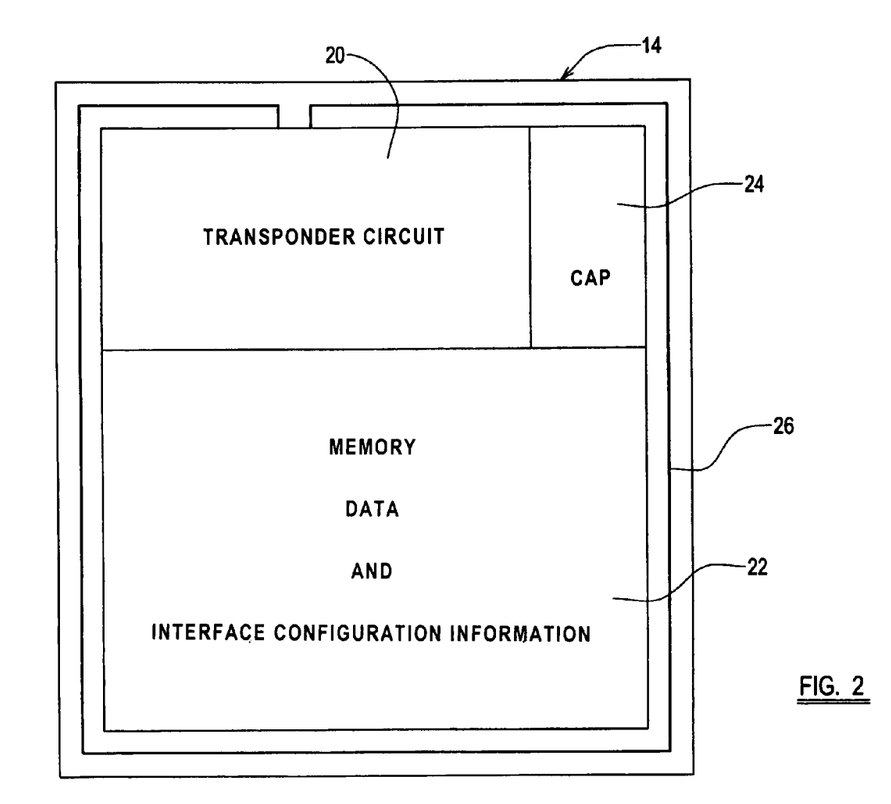
FIG. 2 illustrates a memory tag suitable for use in the document of FIG. 1 and hence for embodiments of the present invention.

Referring now to FIG. 2, a schematic of a memory tag 14 is shown. The memory tag 14 is provided on a chip, and comprises an transponder circuit 20, a memory 22, a power supply capacitor 24 and an antenna coil 26 having only a few turns e.g. five, or as in this case a single turn. The transponder circuit 20 operates at 2.45 GHz, is of an area of approximately 0.5 mm$^2$, and will be described further below. The memory 22 provides 1 Mbit of capacity of non-volatile memory and is of an area of approximately 1 mm$^2$, and uses FRAM (ferroelectric random access memory) or MRAM (magnetoresistive random access memory) or similar memory technology requiring low power. The memory tags 14 are of a substantially square shape in plan view with an external dimension D for their sides of around 1 mm.

Figure 3:
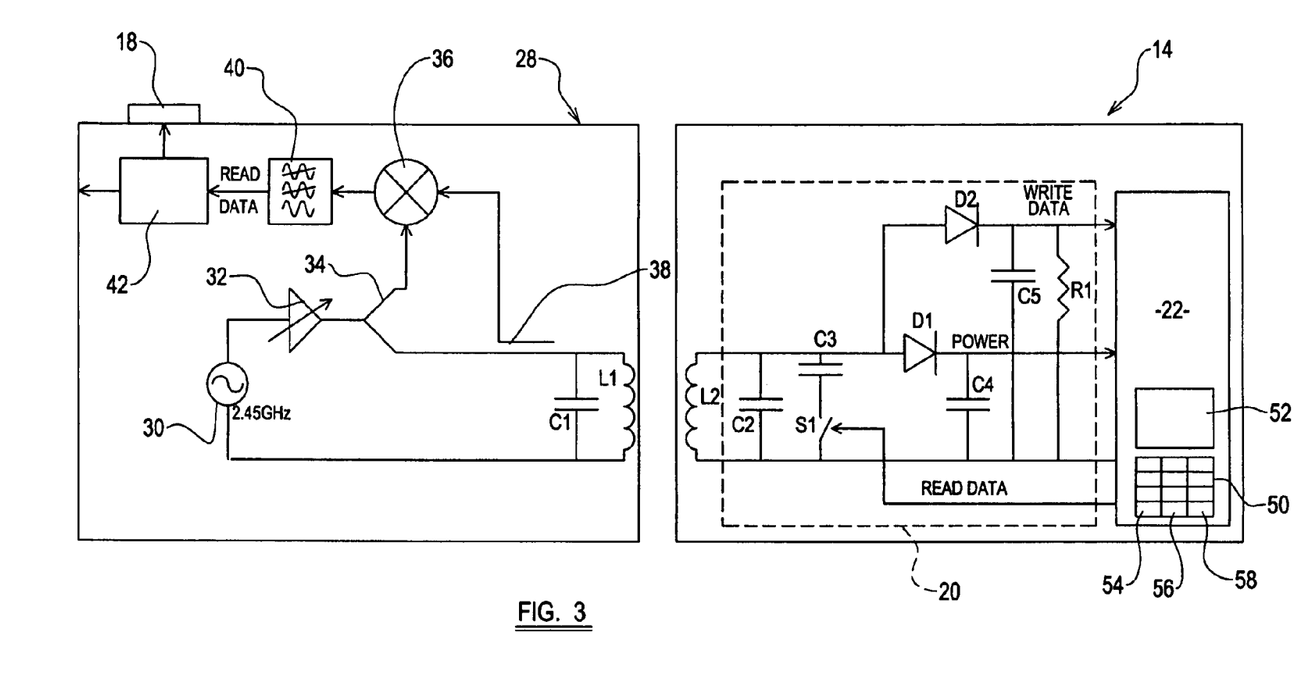
FIG. 3 illustrates the circuitry of the memory tag of FIG. 2 and of a read/write device for wireless communication with the memory tag.

Referring now to FIG. 3, the circuitry of a memory tag 14 and circuitry 28 of the read/write device 16 are illustrated schematically, using conventional component identifications (C-capacitor, L-inductance, R-resistor, D-diode and S-switch). The transponder circuit 20 of the memory tag 14 comprises a capacitor C2 which, in combination with the antenna coil L2(26), forms a resonant circuit with component values being chosen to tune the combination to approximately 2.45 GHz for inductive coupling with the read/write device 16. The portion of transponder circuit 20 responsible for power supply is diode D1 and capacitor C4(24), with diode D1 rectifying the alternating current generated by the inductive coupling and the capacitor C4 acts as a power supply storage. The portion of the transponder circuit 20 responsible for receiving transmitted data from the read/ write device 16 is diode D2, capacitor C5 and resistor R1 which form a simple envelope detector; the data thus received is stored in memory 22. The portion of the transponder circuit 20 responsible for the reading of data from the memory 22 is the tuned circuit L2/C2 in combination with S1 and C3, switching C3 in and out of the circuit using S1 changes the resonance of tuned circuit L2/C2 resulting in phase modulation of the reflected power from the memory tag 14 to the read/write device 16.

The circuit 28 of the read/write device 16 comprises a signal generator 30 which generates a signal at the chosen frequency of 2.45 GHz. This signal passes via an amplitude modulator 32, where it is amplitude modulated with data to be written to the memory tag 14, and a splitter 34, to an antenna L1 and capacitor C1 which form a tuned circuit. The component values of L1 and C1 being chosen to tune it to 2.45 GHz, as for the tuned circuit in the memory tag 14, in order to maximise inductive coupling between the two circuits, and thus transmission of power and data to the memory tag 14.

The splitter 34 takes a part (as much as 50% of the power) of the amplitude modulated signal, for use as a reference signal, and passes it to a multiplier 36. The signal received from the memory tag 14, via the tuned circuit L1/C1 and divided from the outgoing signal by a coupler 38, is also passed to the multiplier 36. Thus the transmitted amplitude modulated signal and received signal are multiplied and then pass through a low pass filter 40 to provide a signal comprising the phase modulation from the memory tag 14 and thus indicative of the data read from the memory tag 14. This signal is then passed to the host computer or other apparatus 17 to which the read/write device 16 is connected, for subsequent data processing. In this example, the read/write device 16 comprises an output controller 42 operable to control the user interface device 18.

One amplitude modulation format which may be used to apply the data to be transmitted to the 2.45 GHz signal is Amplitude Shift Keying (ASK) which only requires the simple envelope detector D2/C5 described in the circuit 20. However, other amplitude modulation formats may also be employed. Further alternatives are Frequency Shift Keying (FSK) and Phase Shift Keying (PSK) that provide near constant envelope modulation (i.e. without any significant amplitude modulation): these options have more complex demodulation requirements and thus demand more complex circuitry in the memory tag 14.

With the apparatus of memory tag 14 and read/write device 16 described above power transfer of around 25% can be achieved with a distance of around 1.8 mm between the antennae L1 and L2, of the read/write device 16 and memory tag 14 respectively. This is sufficient to transfer enough power to the memory tag 14 for it to operate.

The memory tags 14 have an external dimension D of around 1 mm, as described above, and therefore the read/write device 16 can communicate with them over a relatively short range, in this example of approximately 2D.

To permit a read/write device 16 or the apparatus 17 to provide user feedback or user interaction appropriately, the memory tag 14 stores interface configuration information in its memory 22, as shown diagrammatically at 50. The memory tag 14 will also store data in memory 22 as indicated generally at 52. The interface configuration information, in this example, comprises a plurality of status items 54 corresponding to particular classes of control or status information to be transmitted to the read/write device 16. Each status item 54 has an item type 56 associated with the status item 54 classifying the type of status item, for example whether the status item is binary such as a data transfer complete/incomplete status, continuous, for example indicate how much of the data has been transferred, an enumeration or a prompt, requesting a particular response, or any other type as appropriate. Each status item 54 may also have an associated priority 58.

Figure 4:
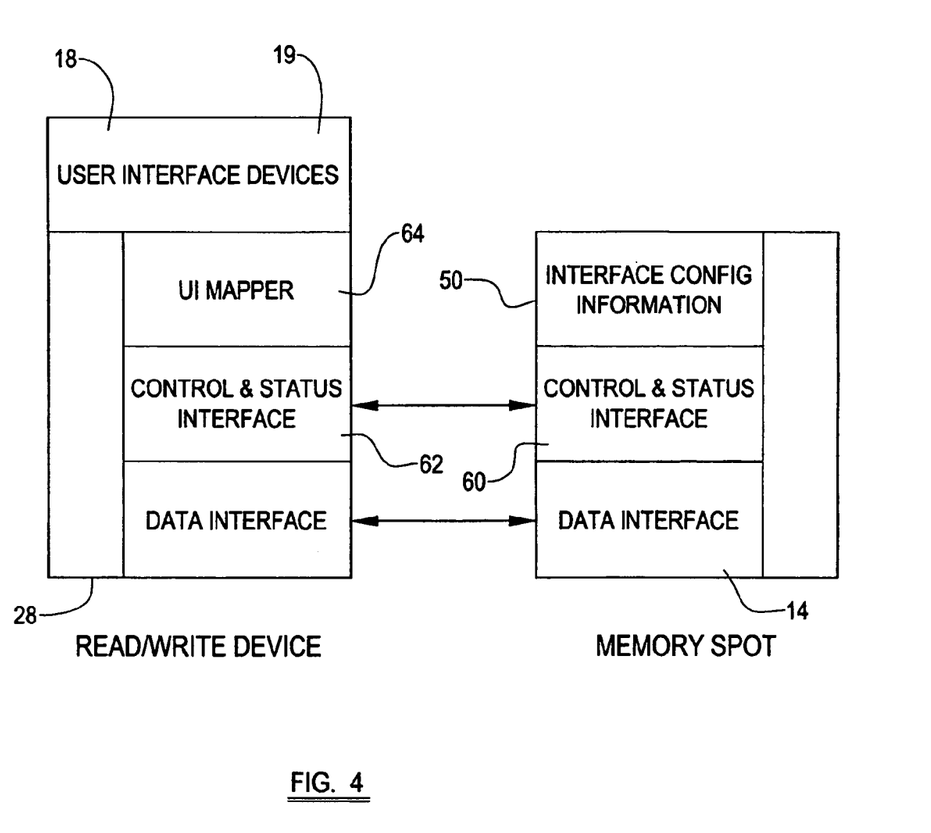
FIG. 4 is a schematic of the transmission of interface configuration information according to an embodiment of the present invention.

With reference to FIG. 4, the memory spot 14 and the reader/writer communicate via a interface protocol for transmitting control and status information and data, generally shown at 60, 62. Thus, both the data 52 and control and status information can be transmitted over the inductive coupling as discussed above. The read/write device 28 is provided with one or more user interface devices shown at 18, 19 and is operable, for example using a controller shown at 42, to map the user interface devices 18, 19 to the control and status information available from the memory spot 14 and stored as the interface configuration information. The interface controller 42 has a user interface mapper, illustrated at 64, which is operable to map the status items set out in the user interface configuration information to specific user interface devices in accordance with the priority order and according to type.

Figure 5:
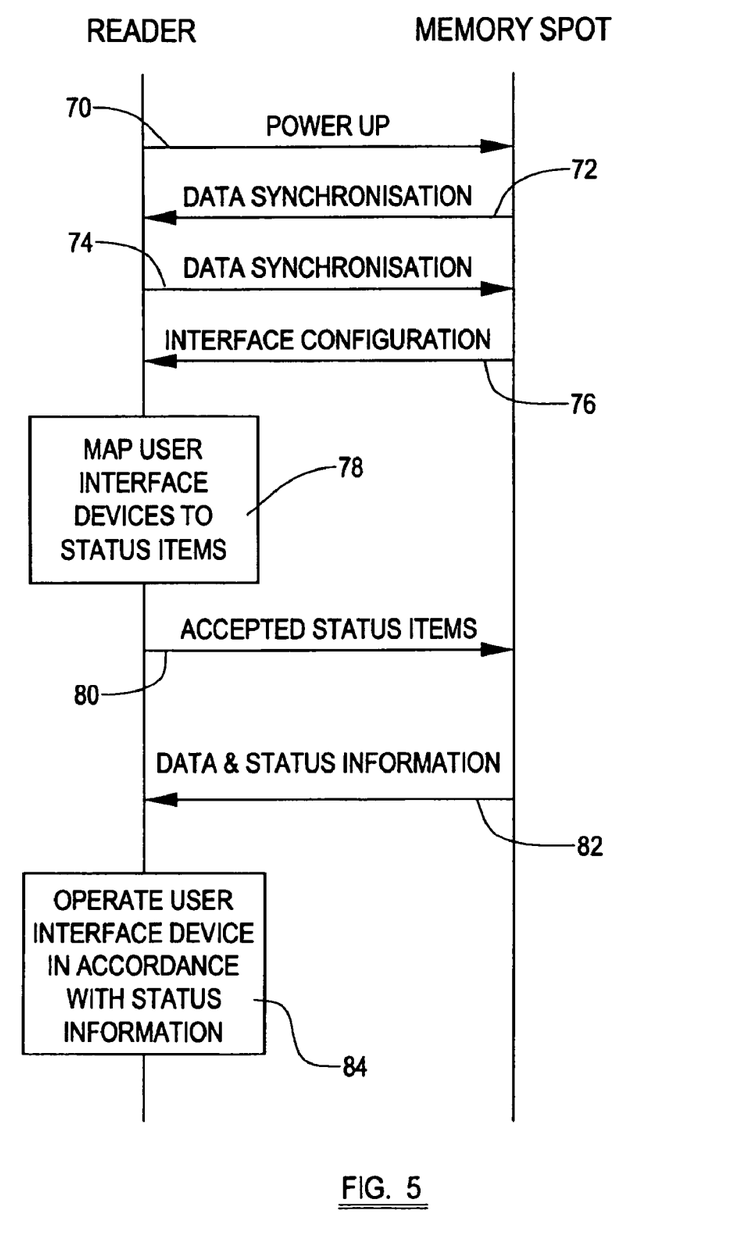
FIG. 5 is a diagram of a method according to an embodiment of the present invention.

It will be apparent that, where the memory spot 14 is operable to receive instructions from the read/write device 16, the read/write device 16 may only be able to process a subset of status items available from the memory spot 14 and can transmit a list of accepted status items to the memory spot 14 indicating those status items which can be processed and the user interface device 18, 19 operated accordingly. The memory spot 14 may then transmit the data 52 and those status items included in the accepted status items list. Thus, as illustrated at FIG. 5, at a first step 70 the memory spot 14 is bought within range of the read/write device 16 to provide inductive coupling and is powered up accordingly. At steps 72 and 74, data synchronisation occurs between the memory spot 14 and the read/write device 16 to ensure that the memory spot 14 and read/write device 16 are able to communicate appropriately. At step 76, the memory spot 14 transmits the interface configuration information to the reader which at step 78 performs the mapping step and at step 80 transmits the list of accepted status items to the memory spot 14. At step 82, the memory spot begins transmitting data and status information, and at step 84 the read/write device is operable to control the user interface devices in accordance with the received status information.

It will be apparent that the present invention thus permits a memory spot 14 to be used with a variety of read/write devices 16 having different user interface devices 18, 19 and may display this information as required. For example, in a very simple example, the user interface device 18 may comprise an LED which is illuminated when data transfer from the memory tag 14 is complete. The user interface controller 42 will then respond to a single status item, indicating that data transfer is complete, and this status item is mapped to a single output device in the form of the LED. Thus, when the read/write device receives status information corresponding to the data transfer complete status item, the LED will be illuminated and the user can then remove the read/write device 16 from the memory tag 14.

It will be apparent however that the user interface devices addressed by the read/write device 16 and the status information transferred may be very much more complex as desired. For example, the user interface device 18, 19 may comprise an audio output device, a display, a soft key or even a force-feedback controller to indicate a desired status. The status information may for example indicate when the reader has been moved away from the spot, may indicate data transfer progress, for example by generating an extending bar corresponding to the proportion of the data transmitted, as indicated by status information corresponding to the data transfer status item, provide a prompt to a user on an appropriate user interface device, or indicate that a memory spot is not relevant to a task performed by the read/write device 16. It may be particularly advantageous that the memory tag 14 may comprise user interface device configuration information relating to a wide variety of user interface devices, and the read/write device 16 will only respond to those status items which it is able to map to a corresponding user interface device 18, 19.

Figure 6:
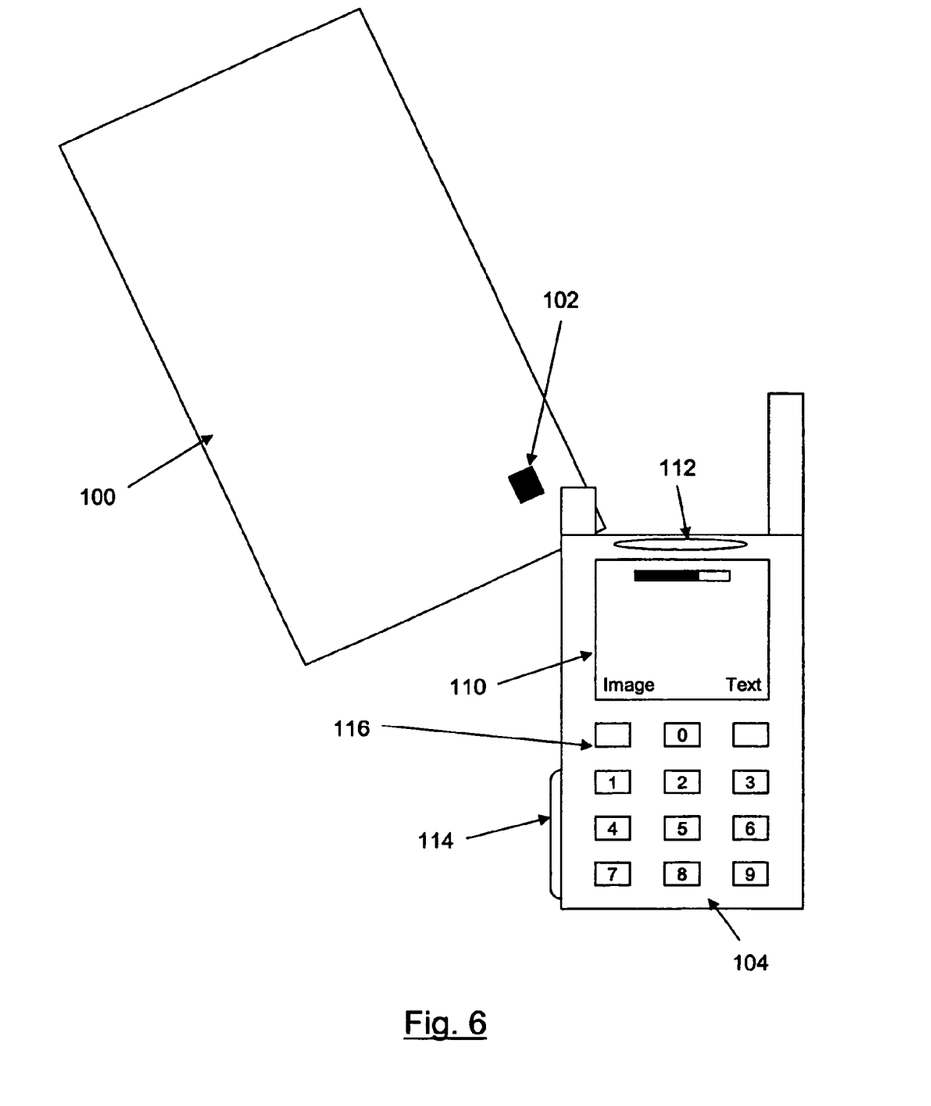
FIG. 6 is an illustration of an embodiment of the present invention in operation.

A more sophisticated user interface mapping using several of these features will now be described, for exemplary purposes, with reference to FIG. 6. A memory tag 102 on a document 100 is being read by a reader 104 implementing the method set out in FIG. 5 in accordance with the functional interrelationships illustrated in FIG. 4. The reader 104 is in this example a cellular telephone into which memory tag reader functionality is integrated. The reader thus contains user interface devices appropriate to this functionality: a display 110, a loudspeaker 112, a vibration alarm 114 and keys 116. The memory tag provides a list of status items with associated types as set out in Table 1 below.

TABLE 1

Status Items with associated types

| STATUS ITEM | ITEM TYPE | PURPOSE OF ITEM |
| --- | --- | --- |
| Read Complete | Binary | Alert that reader can be moved away from tag. |
| Transfer Progress | Continuous | Indicate data transfer progress. |
| Summary type | List | Choose summary type for display |
| Image list | List | Allow for display of individual images in tag. |

As can be determined from these status items, this exemplary memory tag contains a number of images with an accompanying text description. The controller implementing the interface protocol is able to map these status items to the user interface devices of the reader. The "Read Complete" item may be mapped to the most appropriate indicator to give a binary indication to a user—in this case, a brief activation of the vibrating alarm 114 coupled with a beep on the loudspeaker 112. The "Transfer Progress" item is rendered as a status bar at the top of the display 110. The "Summary Type" item—a list indicating that there are two summary types that may be selected, image and text—is mapped to two programmable keys 116 of the reader identified by text at the bottom of the display 110. The "Image List" item—a list enumerating each single image available for display—is mapped to the number keys 116 of the reader. When the image summary key is activated, the display 110 provides thumbnails of all the images in the memory tag. When the text summary key is activated, the display 110 provides a text description of the images in the memory tag. When any of the individual number keys of the reader is activated, the corresponding image is displayed on the display 110. This approach allows individual memory tags to indicate how display should be provided, obviating any need for a specific memory tag image reader software program to be resident on the reader.

In general, the first read/write device to store contents to the memory spot will know the likely use model for the memory tag 14, and in addition to writing data to the memory 22 of the memory tag 14 will write the interface configuration information 52 including at least one status item and an item type associated with the status item and, more probably, a plurality of status items corresponding item types and priorities. It might be envisaged, that subsequent read/write devices, where appropriate, may be able to modify the interface configuration information as appropriate, for example where the stored data is modified.

The memory tags 14 will preferably have a data rate of 10 Mbitss$^{-1}$, which is two orders of magnitude faster than is typical in prior art devices. Such a data rate would enable the read/write device 16 to be held over the memory tag for a very short period of time ("brush and go") for the data to be read or written as appropriate.

Although the memory tags 14 described above operate at 2.45 GHz it should be understood that memory tags operating at other frequencies may be used to implement the invention. Factors affecting the choice of operating frequency for the memory tags are: a) government regulations concerning radio frequency transmissions; b) adequate bandwidth (consistent with government regulations); c) frequency high enough to render the physical size of components in the memory tag small enough to keep the area of silicon required low (and hence the cost to manufacture low); d) frequency low enough to provide adequate performance when using low-cost high-volume CMOS technology to manufacture the memory tag.

The invention claimed is:

1. A memory tag having a memory and powered by and addressable via a radio frequency wireless link to read data from the memory, the memory tag being addressable by a reader, wherein the memory holds data and interface configuration information relating to the operation of an interface device, the interface configuration information comprising at least one status item and an item type associated with the or each status item.

2. A memory tag according to claim 1 wherein the item type comprises one of binary type, enumeration or continuous information.

3. A memory tag according to claim 1 wherein a priority is associated with the, or each, status item.

4. A memory tag according to claim 1 wherein the interface configuration information comprises a plurality of status items and an item type associated with each status item.

5. A memory tag according to claim 4 operable to transmit status information in accordance with a status item.

6. A memory tag according to claim 5 operable to receive a list of accepted status items from a reader and only transmit status information relating to a status item on the list of accepted status items.

7. A reader for reading a memory tag powered by and addressable via a radio frequency wireless link to read data from a memory of the memory tag, wherein the memory holds data and interface configuration information comprising at least one status item and an item type associated with the status item, wherein the reader comprises one or more user interface devices, the reader being operable to read the memory tag and operate the one or more user interface devices in accordance with the interface configuration information by mapping at least one of the one or more user interface devices on to at least one of the at least one status items.

8. A reader according to claim 7 wherein the interface configuration information comprises a plurality of status items and an item type associated with each status item, the reader being operable to map a user interface device to at least a subset of the status items in accordance with the item types.

9. A reader according to claim 8 wherein a priority is associated with each status item and wherein the reader is further operable to map a user interface device to at least a subset of the status items in accordance with the priority of each of the subset of status items.

10. A reader according to claim 8 operable to transmit a list of accepted status items to the memory tag corresponding to the subset of status items.

11. A reader according to claim 7 operable to receive status information in accordance with a status item and operate the user interface device corresponding to the status item in accordance with the status information.

12. A method of writing to a memory tag powered by and addressable via a radio frequency wireless link to read data from a memory of the memory tag, the method comprising the steps of writing data and interface configuration information to the memory, the interface configuration information comprising information relating to the operation of an interface device and comprising at least one status item and an item type associated with the status item.

13. A method according to claim 12 wherein the item type comprises one of binary type, enumeration or continuous information.

14. A method according to claim 12 wherein a priority is associated with the status item.

15. A method according to claim 12 wherein the interface configuration information comprises a plurality of status items and an item type associated with each status item.

16. A method of operating a reader to read a memory tag powered by and addressable via a radio frequency wireless link to read data from a memory of the memory tag, wherein the memory holds data and interface configuration information, the method comprising the steps of reading the memory tag and operating at least one user interface device in accordance with the interface configuration information, wherein the interface configuration information comprises at least one status item and an item type associated with the or each status item, the method comprising the step of mapping at least one of the at least one user interface devices to at least one status item.

17. A method according to claim 16 wherein the interface configuration information comprises a plurality of status items and an item type associated with each status item, the method comprising the step of mapping a user interface device to at least a subset of the status items in accordance with the item types.

18. A method according to claim 17 wherein a priority is associated with each status, the method comprising the step of mapping a user interface device to at least a subset of the status items in accordance with the priority of each of the subset of status items.

19. A method according to claim 17 comprising transmitting a list of accepted status items to the memory tag corresponding to the subset of status items.

20. A method according to claim 16 comprising the steps of receiving status information in accordance with a status item and operating the user interface device corresponding to the status item in accordance with the status information.

* * * * *

UNITED STATES PATENT AND TRADEMARK OFFICE
CERTIFICATE OF CORRECTION

PATENT NO.        : 7,362,625 B2                                    Page 1 of 1
APPLICATION NO.   : 11/256939
DATED             : April 22, 2008
INVENTOR(S)       : David Neil Slatter

It is certified that error appears in the above-identified patent and that said Letters Patent is hereby corrected as shown below:

Col. 6, line 36

In Claim 1 please delete "the or"

A memory tag having a memory and powered by and addressable via a radio frequency wireless link to read data from the memory, the memory tag being addressable by a reader, wherein the memory holds data and interface configuration information relating to the operation of an interface device, the interface configuration information comprising at least one status item and an item type associated with [[the or]] each status item.

Signed and Sealed this
Twenty-sixth Day of April, 2011

David J. Kappos
*Director of the United States Patent and Trademark Office*